(12) United States Patent
Han

(10) Patent No.: US 11,295,538 B2
(45) Date of Patent: Apr. 5, 2022

(54) METHOD AND EQUIPMENT FOR CONSTRUCTING THREE-DIMENSIONAL FACE MODEL

(71) Applicant: ASUSTeK COMPUTER INC., Taipei (TW)

(72) Inventor: Chia-Hui Han, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/171,129

(22) Filed: Feb. 9, 2021

(65) Prior Publication Data

US 2021/0264683 A1 Aug. 26, 2021

(30) Foreign Application Priority Data

Feb. 20, 2020 (CN) .......................... 202010103953.6

(51) Int. Cl.
*G06T 19/20* (2011.01)
*G06T 17/00* (2006.01)
*G06T 7/33* (2017.01)
*H04N 13/221* (2018.01)

(52) U.S. Cl.
CPC ................ *G06T 19/20* (2013.01); *G06T 7/33* (2017.01); *G06T 17/00* (2013.01); *H04N 13/221* (2018.05); *G06T 2200/04* (2013.01); *G06T 2207/30201* (2013.01); *G06T 2219/2004* (2013.01)

(58) Field of Classification Search
None
See application file for complete search history.

(56) References Cited

U.S. PATENT DOCUMENTS 10,789,784 B2 * 9/2020 Lin .................... G06T 15/04
10,861,250 B2 * 12/2020 Long .................... A61C 7/002

FOREIGN PATENT DOCUMENTS

| CN | 109410133 A | 3/2019 |
| CN | 109800699 A | 5/2019 |
| CN | 110175529 A | 8/2019 |
| WO | 2020147346 A1 | 7/2020 |

* cited by examiner

*Primary Examiner* — Robert J Craddock
(74) *Attorney, Agent, or Firm* — McClure, Qualey & Rodack, LLP

(57) ABSTRACT

A three-dimensional face model constructing method includes: obtaining front face information to establish a three-dimensional front face model and generate a front planar image corresponding to the three-dimensional front face model, wherein the front planar image includes first feature points; obtaining full face information to establish a three-dimensional full face model and generate a full face planar image corresponding to the three-dimensional full face model, wherein the three-dimensional full face model includes a specific portion and the full face planar image includes second feature points; superimposing a first block of the front plan image to a second block of the full face planar image according to the correspondence between the first feature points and the second feature points, to obtain a complete full face planar image; and generating a three-dimensional face model according to the complete full face planar image.

14 Claims, 6 Drawing Sheets

METHOD AND EQUIPMENT FOR CONSTRUCTING THREE-DIMENSIONAL FACE MODEL

CROSS-REFERENCE TO RELATED APPLICATION

This application claims the priority benefit of Chinese applications serial No. 202010103953.6, filed on Feb. 20, 2020. The entirety of the above-mentioned patent application is hereby incorporated by reference herein and made a part of specification.

BACKGROUND OF THE INVENTION

Field of the Invention

The invention relates to a method and an equipment for constructing three-dimensional face model.

Description of the Related Art

A three-dimensional face model is constructed according to two-dimensional face images, and in the process of capturing a two-dimensional face image, a positioning bracket is used to fix the user's head to increase the accuracy of the captured image. However, while using the positioning bracket, the positioning bracket covers a part of the user's face, thus the scanned face image in two-dimension has a covered area, which makes the three-dimensional face model incomplete and reduces the quality of the acquired images, which affects the application of the three-dimensional face model in orthodontics or chin beauty.

BRIEF SUMMARY OF THE INVENTION

According to the first aspect, a three-dimensional face model constructing method is provided. The three-dimensional face model constructing method includes the following steps: obtaining front face information of a user in a first time interval to establish a three-dimensional front face model and generate a front planar image corresponding to the three-dimensional front face model, wherein the front planar image includes a plurality of first feature points; obtaining full face information of the user in a second time interval to establish a three-dimensional full face model and generate a full face planar image corresponding to the three-dimensional full face model, wherein the three-dimensional full face model includes a specific portion and the full face planar image includes a plurality of second feature points; superimposing a first block of the front plan image corresponding to the specific portion of the three-dimensional full face model to a second block of the full face planar image corresponding to the specific portion of the three-dimensional full-face model according to the correspondence between the first feature points and the second feature points, to obtain a complete full face planar image; and generating a three-dimensional face model according to the complete full face planar image.

According to the second aspect, a three-dimensional face model constructing equipment is provided. The three-dimensional face model constructing equipment includes: a three-dimensional image capture device, configured to scan a front face of a user in a first time interval to obtain front face information, and scan a full face of the user in a second time interval to obtain full face information; and a computing device, electrically connected to the three-dimensional image capture device, the computing device establishes a three-dimensional front face model according to the front face information to generate a front planar image corresponding to the three-dimensional front face model, and establishes a three-dimensional full face model according to the full face information to generate the full face planar image corresponding to the three-dimensional full face model, wherein the three-dimensional full face model includes a specific portion, the computing device superimposes a first block of the front planar image corresponding to the specific portion of the three-dimensional full face model to a second block of the full face planar image corresponding to the specific portion of the three-dimensional full face model according to the correspondence between the first feature points and the second feature points to obtain a complete full face planar image, and generates a three-dimensional face model according to the complete full face planar image.

In summary, the method of superimposing feature points is utilized to repair the image defects of the specific portion (such as chin or forehead) and obtain a clear and complete three-dimensional face model, to solve the problem in the prior art that the contact area is obscured by the positioning bracket or deformed when the face is three-dimensional scanned.

These and other features, aspects and advantages of the present invention will become better understood with regard to the following description, appended claims, and accompanying drawings.

DETAILED DESCRIPTION OF THE EMBODIMENTS

Figure 1:
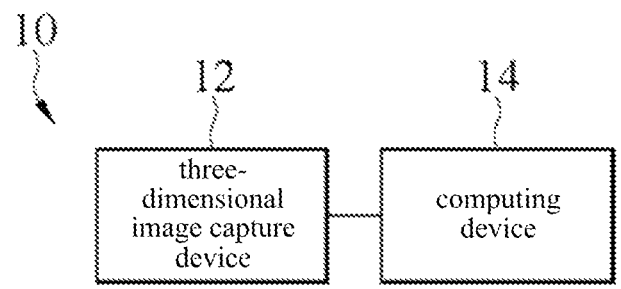
FIG. 1 is a block diagram of a device according to an embodiment.

FIG. 1 is a block diagram of a device according to an embodiment. Please refer to FIG. 1. A three-dimensional face model constructing equipment 10 includes a three-dimensional image capture device 12 and a computing device 14. The three-dimensional image capture device 12 faces the face of a subject to capture at least one corresponding face image. The computing device 14 is electrically connected to the three-dimensional image capture device 12 to receive the face image, and performs subsequent process and applications based on the face image. In one embodiment, the three-dimensional image capture device 12 and the computing device 14 are independent devices. In one embodiment, the three-dimensional image capture device 12 is a three-dimensional infrared camera, and the computing device 14 is a mobile phone, a notebook computer, a tablet computer, a desktop computer, which is not limited herein. In another embodiment, the three-dimensional image capture device 12 and the computing device 14 are integrated in an electronic device (not shown). In one embodiment, the three-dimensional image capture device 12 is a three-dimensional infrared camera built in the electronic device, the computing device 14 is a central processing unit or a microcontroller inside the electronic device, and the electronic device is a mobile phone, a notebook computer, a tablet or desktop computer, which is not limited herein.

Figure 2:
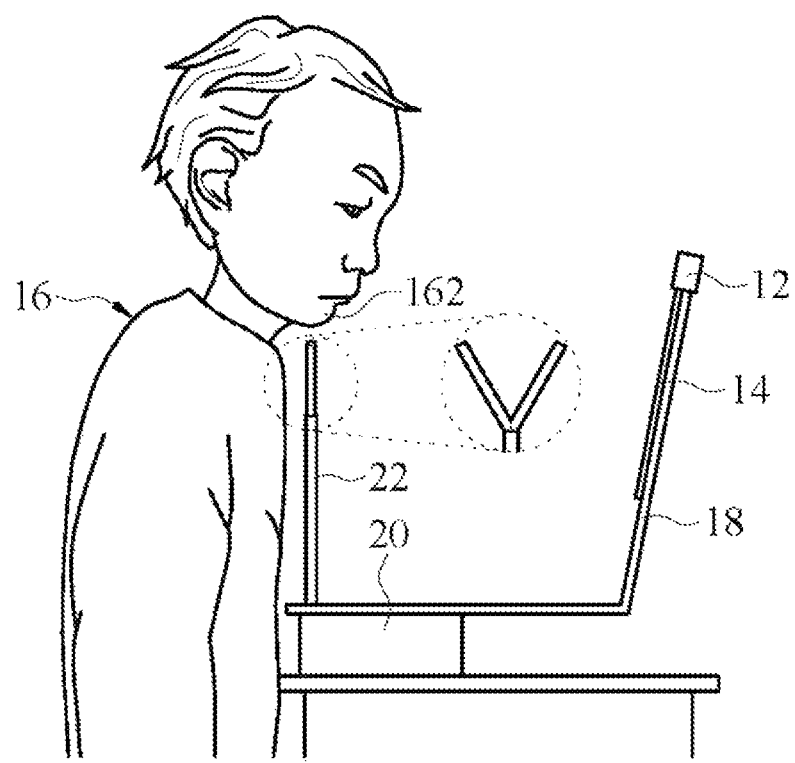
FIG. 2 is a schematic diagram of user positioning according to an embodiment.

FIG. 2 is a schematic diagram of user positioning according to an embodiment. Please refer to FIG. 1 and FIG. 2 at the same time. Before starting to capture the face image of the human, the user 16 is positioned directly ahead of the three-dimensional image capture device 12. In one embodiment, the three-dimensional image capture device 12 is disposed on a rotating support 18. A motor device 20 is connected to the rotating support 18 to drive the rotating support 18, and then the rotating support 18 drives the three-dimensional image capture device 12 to move left and right to capture face images from different angles. Moreover, the three-dimensional face model constructing equipment 10 further includes a positioning bracket 22. The positioning bracket 22 is disposed on the motor device 20 and connects to the motor device 20 to drive the positioning bracket 22 up or down thereby.

In an embodiment, for infrared rays of the three-dimensional image capture device 12 to pass through smoothly, the positioning bracket 22 is made of a high light transmission material, such as acrylic material or glass that has a visible light transmittance of 92% and allows infrared rays with a wavelength of less than 2800 nm to pass through. In one embodiment, the positioning bracket 22 is designed as a Y-shaped bracket so as to support a contact area 162 of the user 16 with the least contact area.

Figure 3:
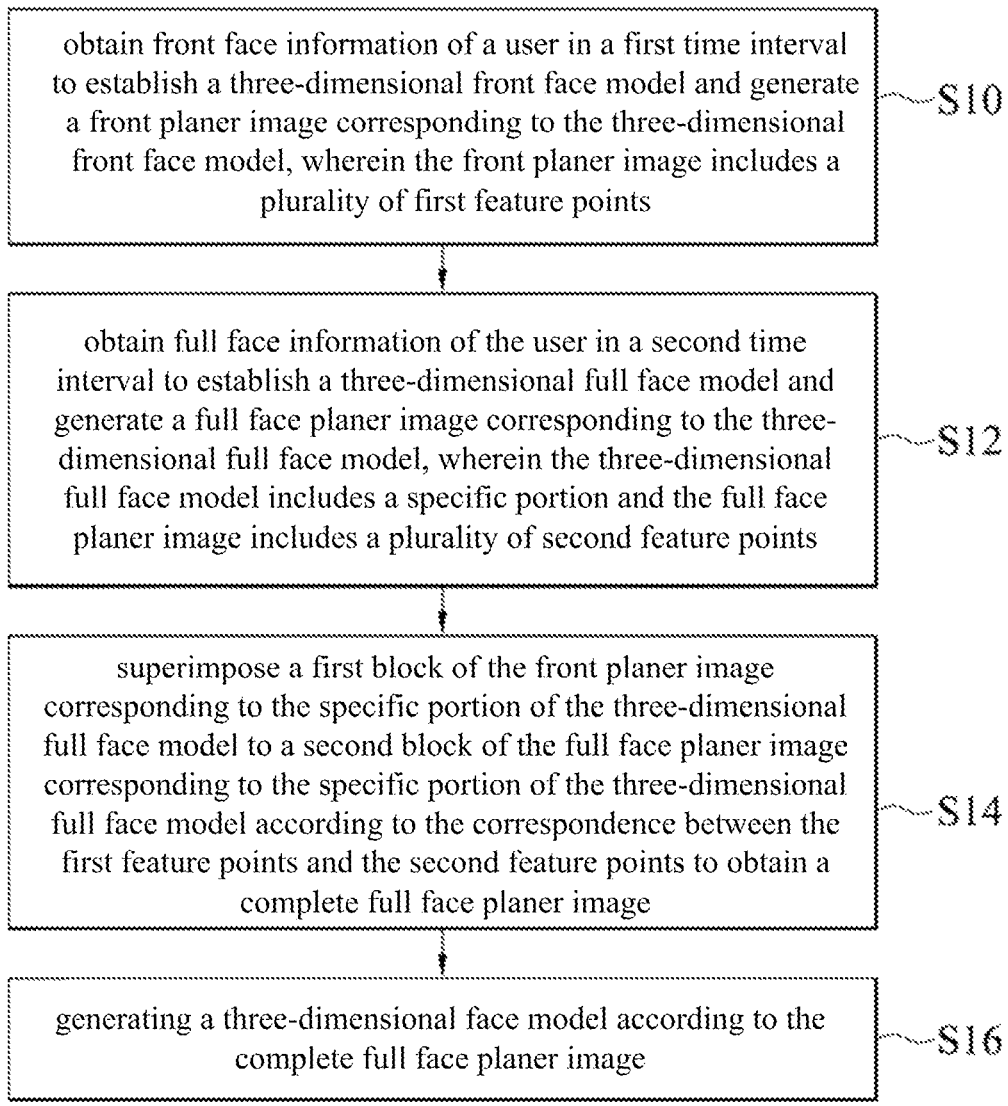
FIG. 3 is a schematic flowchart of a method of an embodiment.
Figure 4:
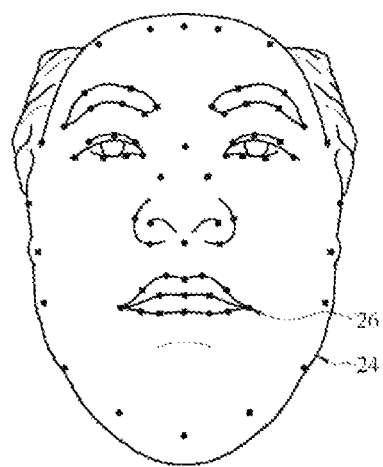
FIG. 4 is a schematic diagram of a three-dimensional front face model according to an embodiment.
Figure 5:
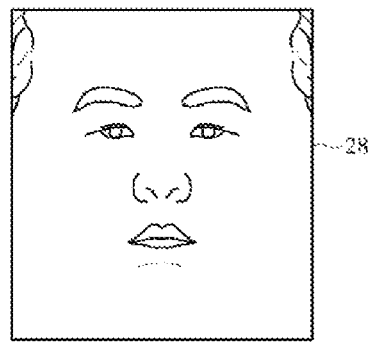
FIG. 5 is a schematic diagram of a front planar image according to an embodiment.

FIG. 3 is a schematic flowchart of a method of an embodiment. Please refer to FIG. 1 to FIG. 3 at the same time. After the user 16 is positioned, the three-dimensional image capture device 12 scans a front face of the user 16 at a fixed point in a first time interval to capture the front face information and transmit it to the computing device 14. The computing device 14 receives the front face information and performs calculations to obtain a three-dimensional front face model 24 as shown in FIG. 4. The three-dimensional front face model 24 includes multiple feature points 26 evenly distributed on the face, and a front planar image 28 corresponding to the three-dimensional front face model 24 is generated (as in step S10), as shown in FIG. 5.

Figure 6:
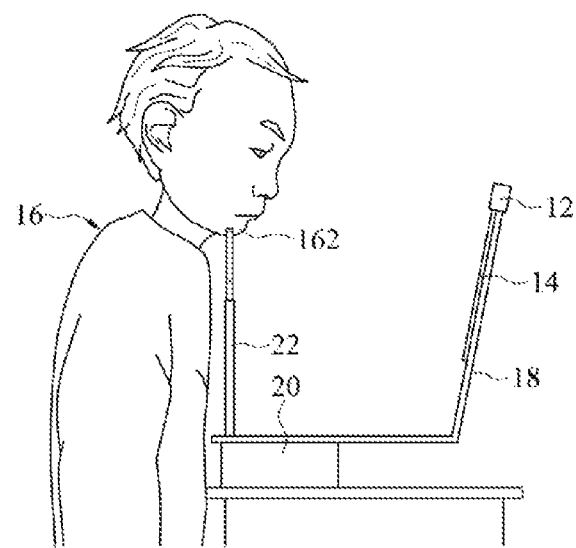
FIG. 6 is a schematic diagram of using a positioning bracket to support a user's face according to an embodiment.
Figure 7:
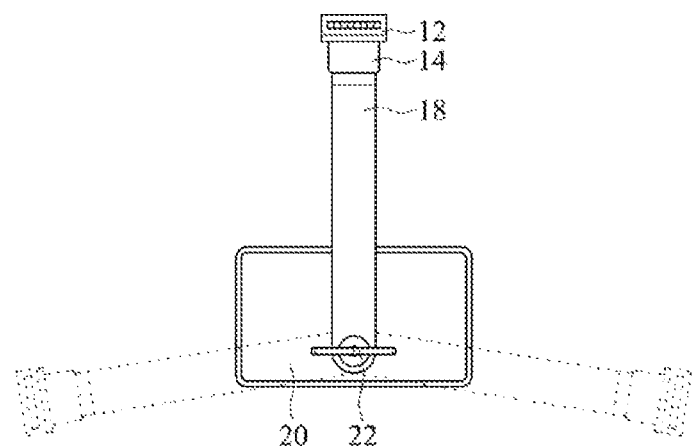
FIG. 7 is a schematic diagram of a three-dimensional image capture device moving left and right according to an embodiment.
Figure 8:
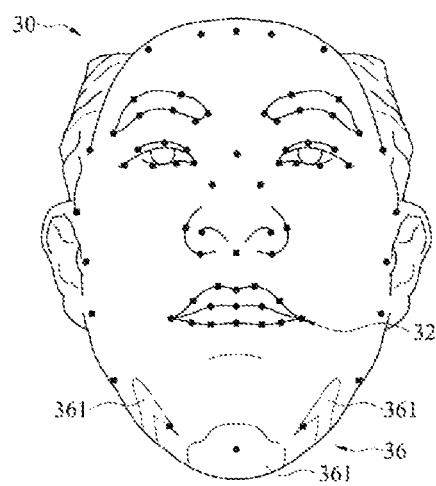
FIG. 8 is a schematic diagram of a three-dimensional full face model according to an embodiment.
Figure 9:
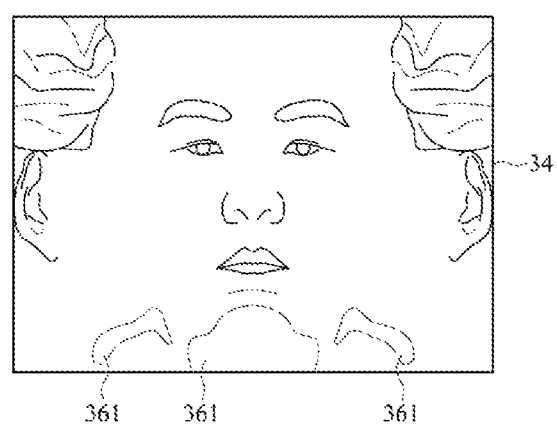
FIG. 9 is a schematic diagram of a full face planar image according to an embodiment.

Then, obtains full face information of the user in a second time interval to establish a three-dimensional full face model, and generates a full face planar image corresponding to the three-dimensional full face model (as in step S12). Please refer to FIG. 1 to FIG. 7, the motor device 20 drives the positioning bracket 22 up to support the contact area 162 of the user 16, as shown in FIG. 6. The contact area 162 is a portion of the face such as chin, forehead or any portion that supports head firmly without shaking or displacement, but which is not limited herein. In this embodiment, the contact area 162 is chin. In step S12, when the positioning bracket 22 supports the contact area 162 of the face of the user 16, the three-dimensional image capture device 12 starts to scan the full face from left to right of the user 16 in the second time interval, and the second time interval is greater than the first time interval. Meanwhile, the motor device 20 drives the rotating support 18 to move from a central position to left with a preset angle and move from the central position to right with the preset angle, the preset angle is 99 degrees in one embodiment, which drives the three-dimensional image capture device 12 on the rotating support 18 also moves from the central position to left with 99 degrees and move from the central position to right with 99 degrees, to sequentially scan the full face of the user 16 from different angles, and transmit the full face information obtained by the three-dimensional image capture device 12 to the computing device 14. The computing device 14 receives the full face information and performs calculations to obtain a three-dimensional full face model 30 shown in FIG. 8. The three-dimensional full face model 30 has a specific portion 36 and includes multiple feature points 32 that evenly distributed on the face. The computing device 14 generates a full face planar image 34 corresponding to the three-dimensional full face model 30 (as shown in FIG. 9). In the second time interval, the three-dimensional image capture device 12 has a large viewing angle and a large capturing range (including left and right ears and chin), so the three-dimensional full face model 30 and the full face planar image 34 also have a large viewing range. Since the face is supported by the positioning bracket 22, the specific portion 36 has an imprint mark 361 corresponding to the contact position of the positioning bracket 22 where the face contacts the positioning bracket 22, resulting in image defects.

In one embodiment, the first time interval is only one second, and the face of the user 16 is kept still without positioning bracket 22 for such a short time. When the second time interval is set for 12 seconds, the positioning bracket 22 is configured to support the face of the user 16 more stably, and the three-dimensional image capture device 12 has enough time to capture images with various angles of the face.

Figure 10:
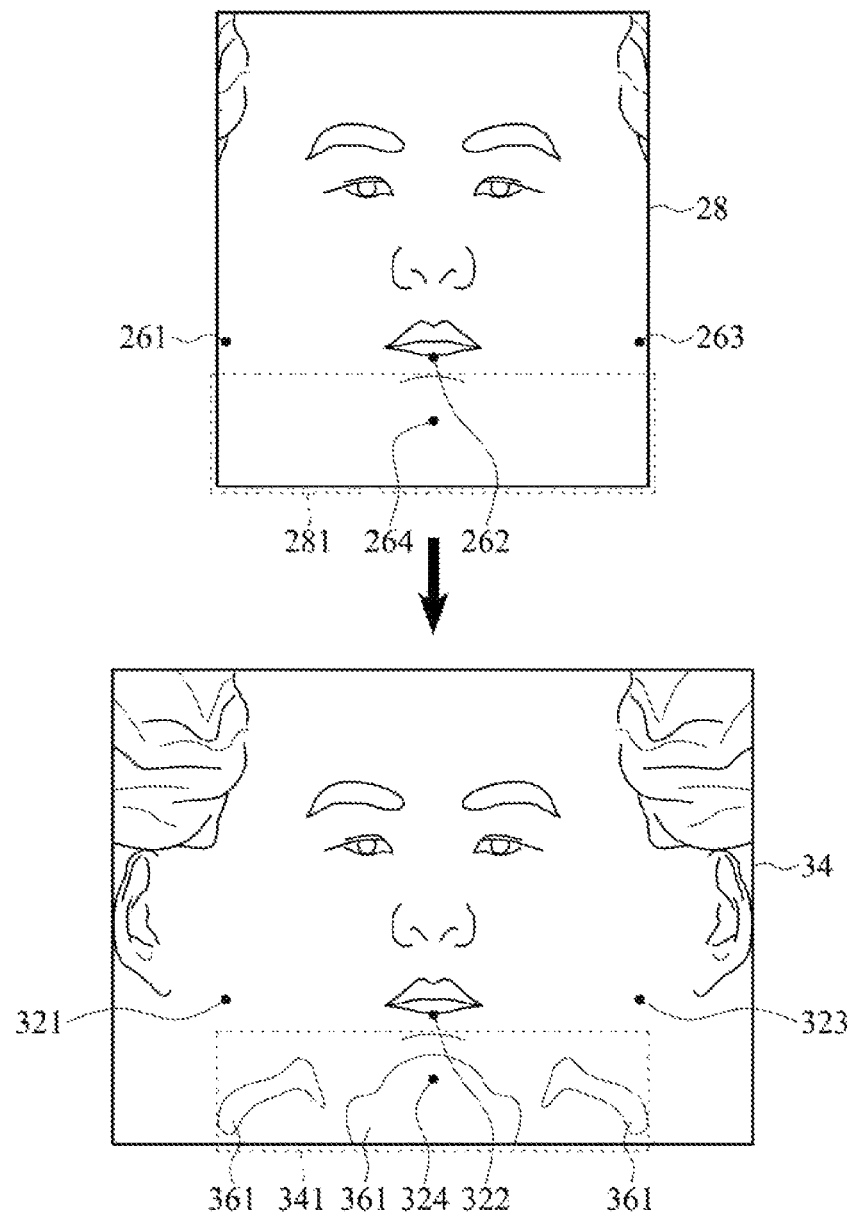
FIG. 10 is a schematic diagram of a planar image in the overlay processing according to an embodiment.
Figure 11:
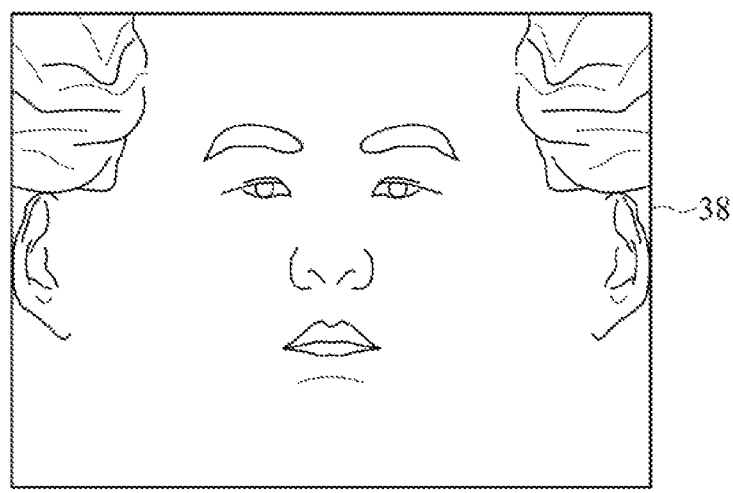
FIG. 11 is a schematic diagram of a plan view image of a human face according to an embodiment.
Figure 12:
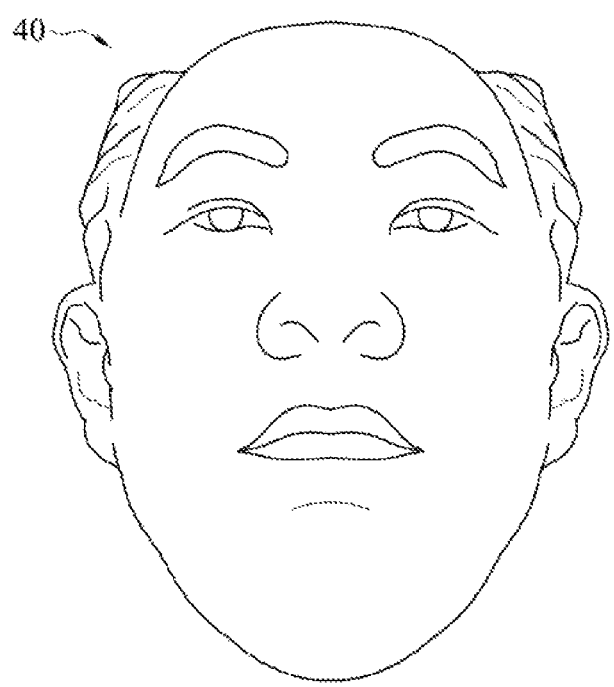
FIG. 12 is a schematic diagram of a three-dimensional face model according to an embodiment.

Please refer to FIG. 1 to FIG. 12. The front planar image 28 includes a plurality of first feature points 261 to 264 (the first feature points 261 to 264 are selected from the feature points 26), and the full face planar image 34 includes a plurality of second feature points 321 to 324 (the second feature points 321 to 324 are selected from the feature points 32). In an embodiment, the front planar image 28 has a first block 281 corresponding to the specific portion 36 of the three-dimensional full face model 30, and the full face planar image 34 has a second block 341 corresponding to the specific portion 36 of the three-dimensional full face model 30. The computing device 14 superimposes the first block 281 of the front planar image 28 to the second block 341 of the full face planar image 34 (as shown in FIG. 10) according to the correspondence between the first feature points 261 to 264 of the front planar image 28 and the second feature points 321 to 324 of the full face planar image 34. In detail, the area of the first block 281 is equal to the area of the second block 341, and the second block 341 has the imprint mark 361. The computing device 14 identifies the location of the imprint mark 361 of the specific portion 36 by skin color detection technology to determine the area of the second block 341 and the area of first block 281, and then superimpose the first block 281 without the imprint mark to the second block 341 with the imprint mark 361, to obtain a complete full face planar image 38 (step S14), as shown in FIG. 11. Finally, the computing device 14 generates a complete and flawless three-dimensional face model 40 according to the complete full face planar image 38 (step S16), as shown in FIG. 12.

The method disclosed in this application includes multiple steps or process for implementing the described method. Without departing from the claims, the steps in the foregoing method can be interchanged with each other. For example, in the flowchart shown in FIG. 3, step S10 and step S12 can be interchanged with each other. In other words, first obtaining the front planar image 28 of FIG. 5 or the full face planar image 34 of FIG. 9 will not affect the subsequent processing, and can still continue to perform the superimposing processing of the subsequent step S14 without being affected by the interchange step.

In summary, the method of superimposing the feature points is used to repair the image defect of the specific portion (such as the chin or forehead), and obtain a clear and complete three-dimensional face model to improve the quality of the images obtained during three-dimensional scanning.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A three-dimensional face model constructing method, comprising:
    obtaining front face information of a user in a first time interval to establish a three-dimensional front face model and generate a front planar image corresponding to the three-dimensional front face model, wherein the front planar image includes a plurality of first feature points;
    obtaining full face information of the user in a second time interval to establish a three-dimensional full face model and generate a full face planar image corresponding to the three-dimensional full face model, wherein the three-dimensional full face model includes a specific portion and the full face planar image includes a plurality of second feature points;
    superimposing a first block of the front plan image corresponding to the specific portion of the three-dimensional full face model to a second block of the full face planar image corresponding to the specific portion of the three-dimensional full-face model according to the correspondence between the first feature points and the second feature points, to obtain a complete full face planar image; and
    generating a three-dimensional face model according to the complete full face planar image.

2. The three-dimensional face model constructing method according to claim 1, wherein the second time interval is greater than the first time interval.

3. The three-dimensional face model constructing method according to claim 1, wherein the face of the user is scanned by a three-dimensional image capture device.

4. The three-dimensional face model constructing method according to claim 3, wherein in the step of obtaining the front face information of the user in the first time interval, the three-dimensional image capture device captures the face of the user with fixed-point scans.

5. The three-dimensional face model constructing method according to claim 3, wherein in the step of obtaining the full face information of the user in the second time interval, the three-dimensional image capture device moves from a central position to left with a preset angle and moves from the central position to right with the preset angle to scan and capture the face of the user.

6. The three-dimensional face model constructing method according to claim 3, wherein the three-dimensional image capture device is a three-dimensional infrared camera.

7. A three-dimensional face model constructing equipment, comprising:
    a three-dimensional image capture device, configured to scan a front face of a user in a first time interval to obtain front face information, and to scan a full face of the user in a second time interval to obtain full face information; and
    a computing device, electrically connected to the three-dimensional image capture device, the computing device establishes a three-dimensional front face model according to the front face information to generate a front planar image corresponding to the three-dimensional front face model, and establishes a three-dimensional full face model according to the full face information to generate the full face planar image corresponding to the three-dimensional full face model, wherein the three-dimensional full face model includes a specific portion, the computing device superimposes a first block of the front planar image corresponding to the specific portion of the three-dimensional full face model to a second block of the full face planar image corresponding to the specific portion of the three-dimensional full face model according to the correspondence between the first feature points and the second feature points to obtain a complete full face planar image, and generates a three-dimensional face model according to the complete full face planar image.

8. The three-dimensional face model constructing equipment according to claim 7, further comprising a positioning bracket, for supporting the face of the user, the contact position where the face contacts the positioning bracket corresponds to the specific portion of the three-dimensional full face model.

9. The equipment for constructing the three-dimensional face model according to claim 8, wherein the positioning bracket is made of a high light transmission material.

10. The three-dimensional face model constructing equipment according to claim 8, wherein the positioning bracket is a Y-shaped bracket.

11. The three-dimensional face model constructing equipment according to claim 7, wherein the second time interval is greater than the first time interval.

12. The three-dimensional face model constructing equipment according to claim 7, wherein the three-dimensional image capture device scans and captures the front face of the user in the first time interval.

13. The three-dimensional face model constructing equipment according to claim 7, wherein the three-dimensional image capture device is to move from a central position to left with a preset angle and move from the central position to right with the preset angle in the second time interval to scan and capture the full face of the user.

14. The three-dimensional face model constructing equipment according to claim 7, wherein the three-dimensional image capture device is a three-dimensional infrared camera.

\* \* \* \* \*